United States Patent
Goodman

(10) Patent No.: US 10,349,129 B2
(45) Date of Patent: Jul. 9, 2019

(54) SYSTEMS AND METHODS FOR A HARDWARE FEEDBACK LOOP TO VERIFY RECEIVED CONTENT HAS BEEN PRESENTED ON A DISPLAY

(71) Applicant: vitroTV Corporation, Austin, TX (US)

(72) Inventor: David H. Goodman, Austin, TX (US)

(73) Assignee: vitroTV HK Ltd, Central Hong Kong (HK)

( * ) Notice: Subject to any disclaimer, the term of this patent is extended or adjusted under 35 U.S.C. 154(b) by 0 days.

(21) Appl. No.: 15/651,131

(22) Filed: Jul. 17, 2017

(65) Prior Publication Data
US 2018/0070133 A1 Mar. 8, 2018

Related U.S. Application Data

(60) Provisional application No. 62/383,766, filed on Sep. 6, 2016.

(51) Int. Cl.
*H04N 21/442* (2011.01)
*H04L 9/32* (2006.01)
*H04N 21/658* (2011.01)

(52) U.S. Cl.
CPC ..... *H04N 21/44204* (2013.01); *H04L 9/3239* (2013.01); *H04L 9/3297* (2013.01); *H04N 21/6582* (2013.01); *H04L 2209/60* (2013.01)

(58) Field of Classification Search
CPC .......... H04N 21/44204; H04N 21/6582; H04L 9/3239; H04L 9/3297
See application file for complete search history.

(56) References Cited

U.S. PATENT DOCUMENTS

| 7,447,777 | B1* | 11/2008 | Singh Ahuja | H04L 12/66 709/227 |
| 2004/0228413 | A1* | 11/2004 | Hannuksela | H04N 21/6437 375/240.25 |
| 2006/0015904 | A1* | 1/2006 | Marcus | G11B 27/034 725/46 |
| 2009/0006999 | A1* | 1/2009 | Roberts | G11B 27/034 715/772 |
| 2009/0259941 | A1* | 10/2009 | Kennedy, Jr. | G06F 17/3079 715/719 |
| 2011/0055765 | A1* | 3/2011 | Neubrand | H04N 1/00204 715/838 |
| 2011/0246460 | A1* | 10/2011 | Hsieh | G06Q 30/02 707/736 |
| 2013/0188926 | A1* | 7/2013 | Rajagopalan | G11B 27/36 386/248 |
| 2015/0350747 | A1* | 12/2015 | Jackson | H04N 21/8549 725/38 |
| 2015/0382075 | A1* | 12/2015 | Neumeier | H04N 5/44591 725/34 |
| 2016/0337426 | A1* | 11/2016 | Shribman | H04L 65/4084 |
| 2017/0118523 | A1* | 4/2017 | Gupta | H04N 21/47217 |

\* cited by examiner

*Primary Examiner* — Pinkal R Chokshi
(74) *Attorney, Agent, or Firm* — Pierson IP, PLLC

(57) ABSTRACT

Examples of the present disclosure are related to systems and methods for a hardware feedback loop that verifies received media has been presented on asynchronous displays. More particularly, embodiments may be utilized as an auditing tool to provide assurances that images appear on a display via a timestamp verification.

20 Claims, 4 Drawing Sheets

SYSTEMS AND METHODS FOR A HARDWARE FEEDBACK LOOP TO VERIFY RECEIVED CONTENT HAS BEEN PRESENTED ON A DISPLAY

CROSS-REFERENCE TO RELATED APPLICATIONS

This application claims a benefit of priority under 35 U.S.C. § 119 to Provisional Application No. 62/383,766 filed on Sep. 6, 2016, which is fully incorporated herein by reference in its entirety.

BACKGROUND INFORMATION

Field of the Disclosure

Examples of the present disclosure are related to systems and methods for a hardware feedback loop that verifies received media has been presented on asynchronous displays. More particularly, embodiments may be utilized as an auditing tool to provide assurances that content appears on a display via a timestamp verification.

Background

Schools, hospitals, commercial businesses, cafeterias, etc. have relied on printed signage, posters, and permanent kiosks to offer information to direct and induce behavior. Advances in technology have created new channels and means to asynchronously present information to people via electronic display devices.

Currently, to determine if content has been presented on external displays, advertisers rely on audience measurements techniques to determine how many people are in an audience. For example, the audience measurement techniques may determine audience sizes through surveys, hits on a webpage, internet usage parameters, etc. Yet, all of these metrics require data supplied by third parties, which rely on auditing companies to determine audience measurement techniques or hosting websites to acquire metrics. To this end, current systems and methods audit viewership based on third parties or require data managed by a hosting website that are determined at a software level.

When using distributed signage with electronic display devices, conventional types of verification and auditing are difficult, if not impossible to implement. This is due to distributed signage being location specific and can only be verified on a display by being located at a specific display. It is currently impossible to verify that content has been presented on distributed signage on a hardware level.

Accordingly, needs exist for more effective and efficient systems and methods that include a hardware verified feedback loop located at a display that creates a timestamped log of media presented on a display.

SUMMARY

Embodiments are configured to be a hardware feedback loop to ensure that a specific content, media, message, etc. is presented on asynchronous displays on a distributed network, and to create a timestamp associated with when the media is presented on the display. Embodiments may be configured to implement an auditing procedure for advertisers, agencies, or content providers to determine when, where, and what content was displayed on an electronic signage device. The electronic signage devices may include dual or redundant pathways that offer lower costs and higher reliability, which include a thin-client display having dual path connectivity via a wide area network and a local area network.

At intervals or when a new frame of content is presented on a display, embodiments may determine a checksum and timestamp when the frame of media is presented on a display. The checksum may be utilized to recreate the frame of the content presented on the display at the time associated with the timestamp. The checksum may be determined based on the frame of the content presented on the display utilizing a DCIC circuit that is built into a processor physically located at the display. Therefore, the checksum and timestamp are located at the display itself, such that advertisers may have surety that content is presented on the display at the time associated with the timestamp.

To create the checksum, a DCIC circuit may be connected between a microprocessor and the display. Initially, the microprocessor may transmit content to be presented on the display through a frame buffer. A first checksum may be determined based on what was transmitted to the display through the frame buffer. Then, through a separate circuit, the DCIC circuit may determine a second checksum based on a frame presented on a display at a given time. The multiple checksums create a double authentication verification at the display. This process may be repeated for each frame of the content, at specific intervals of frames (i.e. every ten frames), at given time intervals (i.e. every ten seconds), a given number of times per parts of content (i.e. every specific video is checked once or twice), or a combination. In embodiments, if the frames of the content are the same, the first checksum and the second checksum should match.

However, if the frame buffer is overridden before the content is actually presented on the display, the two checksums may not match. Furthermore, if the display is turned off, then the second checksum may never be created because the content may not be presented on the display. To this end, embodiments create an auditing process that is employed at the hardware level, and not at the software level that is currently implemented.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Figure 1:
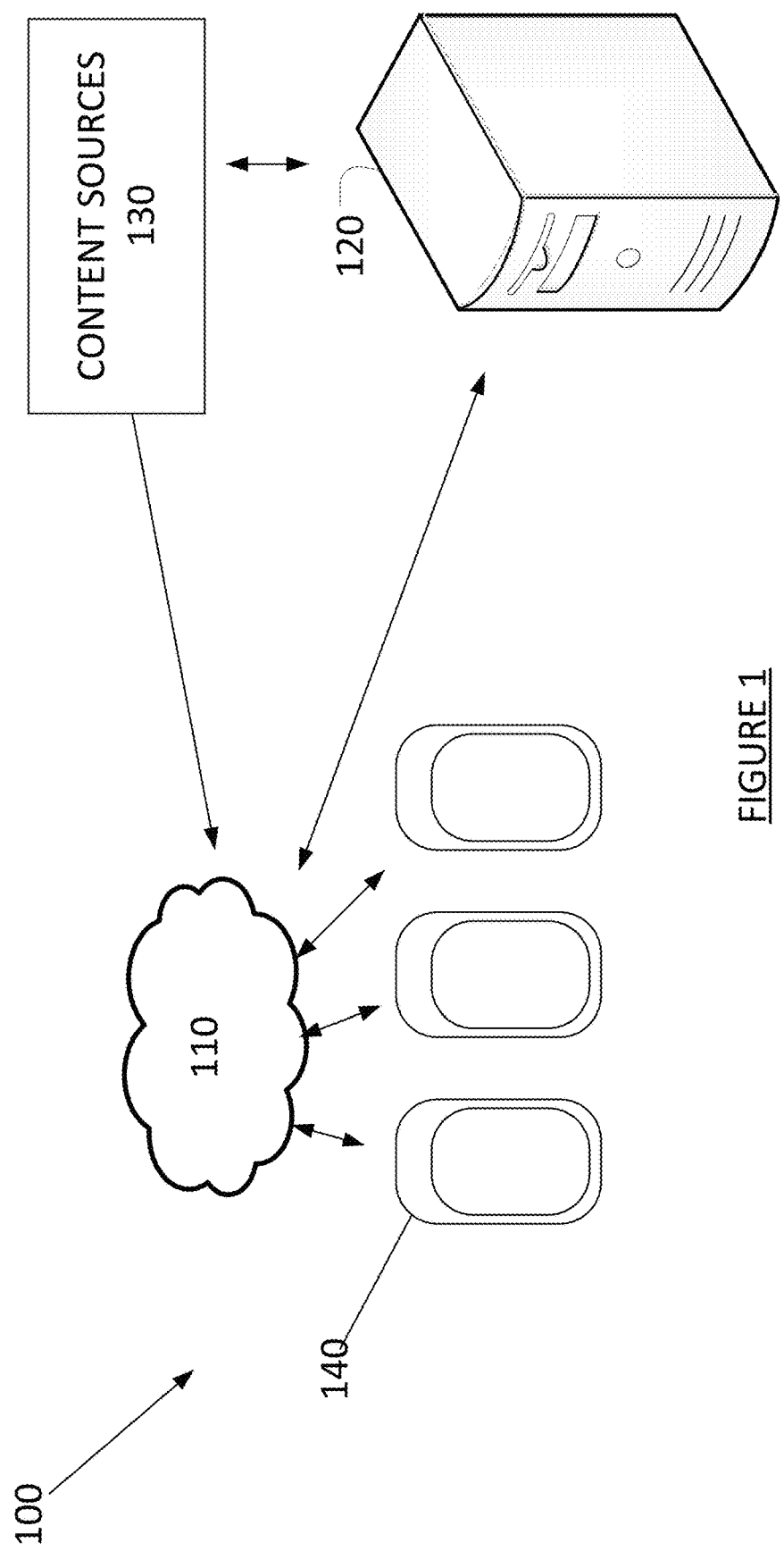
FIG. 1 depicts a topology for content display system, according to an embodiment.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments of the present disclosure. Also, common but well-understood elements that are useful or necessary in a commercially feasible embodiment are often not depicted in order to facilitate a less obstructed view of these various embodiments of the present disclosure.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Embodiments are configured to be a hardware feedback loop to ensure that a specific frame of content, media, message, etc. is presented on asynchronous displays on a distributed network.

Turning now to FIG. 1, FIG. 1 depicts a topology for content display system 100. System 100 may include a network 110, a content management server 120, content sources 130, and thin-client display devices 140.

Network 110 may be a wide area network (WAN) that extends over a large geographical distance, a wireless local area network (WLAN) that is configured to link two or more devices within a limited area, such as a home, school, commercial building, office building, etc., or any other type of wireless or wired network. For example, network 110 may be a wireless communications network, digital radio, or cellular network operating over CDMA, GSM, etc. The network 110 may be operated by telecommunications providers. Alternatively, network 110 may be a Wi-Fi network. Network 110 may be configured to allow for data transmission over a closed loop network by users with network credentials. It will be understood that network 110 may be a combination of multiple different kinds of wired or wireless networks operating over a first network protocol.

Content management server 120 may be a computing device, such as a general hardware platform server configured to support mobile applications, software, content, and the like executed on thin-client display devices 140. Content management server 120 may include physical computing devices residing at a particular location or may be deployed in a cloud computing network environment. In this description, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.). Content management server 120 may include any combination of one or more computer-usable or computer-readable content.

Content management server 120 may be configured to communicate content, audio data, video data, etc. (referred to hereinafter individually and collectively as "content") over network 110. The content may be comprised of a single frame or multiple frames that are electronically coded to form a still image. Content may be received from third party content sources 130 and/or local content sources 130. Content management server 120 may be configured to transmit content over network 120 to be presented on thin-client display 140.

Furthermore, content management server 120 may be configured to schedule of cycle the presentation of pieces of content on thin-client displays 140, wherein the schedule may be asynchronous. Content management server 120 may be configured to store attribute information associated with each thin-client display device 140 indicating the location of a thin-client display device 140, the content currently displayed at each thin-client display device 140, a history of the content presented at each thin-client display device 140, a schedule of content to be presented on each thin-client display device 140, network credentials associated with network 110, phone number or other unique identifiers identifying sources to receive content from third party content sources over network 110, etc.

In embodiments, content server 120 may receive content from content sources 130, such as third party content sources and local area content sources.

The third party content sources may be computing devices associated with local, state, and federal institutions, such as fire departments, police departments, and other emergency personnel. The third party content sources may be configured to transmit content to be presented on thin-client displays devices 140, wherein the content is transmitted directly to the thin-client display devices 140 via network 110 or by transmitting the content to content management server 120.

The local area content sources may any computing device configured to transmit content associated with locally developed content, advertising content, and remote content developed by a site owner, such as a franchise owner, state agency, school, district, national agency, etc. The local area content sources may be configured to transmit content to be presented on thin-client display devices 140 on a schedule or cycle. In other embodiments, the local area content sources may be configured to transmit content to be presented on thin-client display device 140 by transmitting the content to content management server 120, which may transmit the content over network 110.

Thin-client display devices 140 may be lightweight computing and display devices that are configured to remote into content management server 120, and present content to users. In embodiments, the presented content may be asynchronously presented on different display devices 140, such that a first display device 140 may present a first type of content at a first period of time and a second display device 140 may present the first type of content at a different period of time. Thin-client display device 140 may rely on content management server 120 for processing. Thin-client display devices 140 may be configured to communicate and receive data and content over dual pathways, over network 110. By utilizing dual pathways for communications, the risk of network connectivity errors may be mitigated, reduced, limited, etc.

Figure 2:
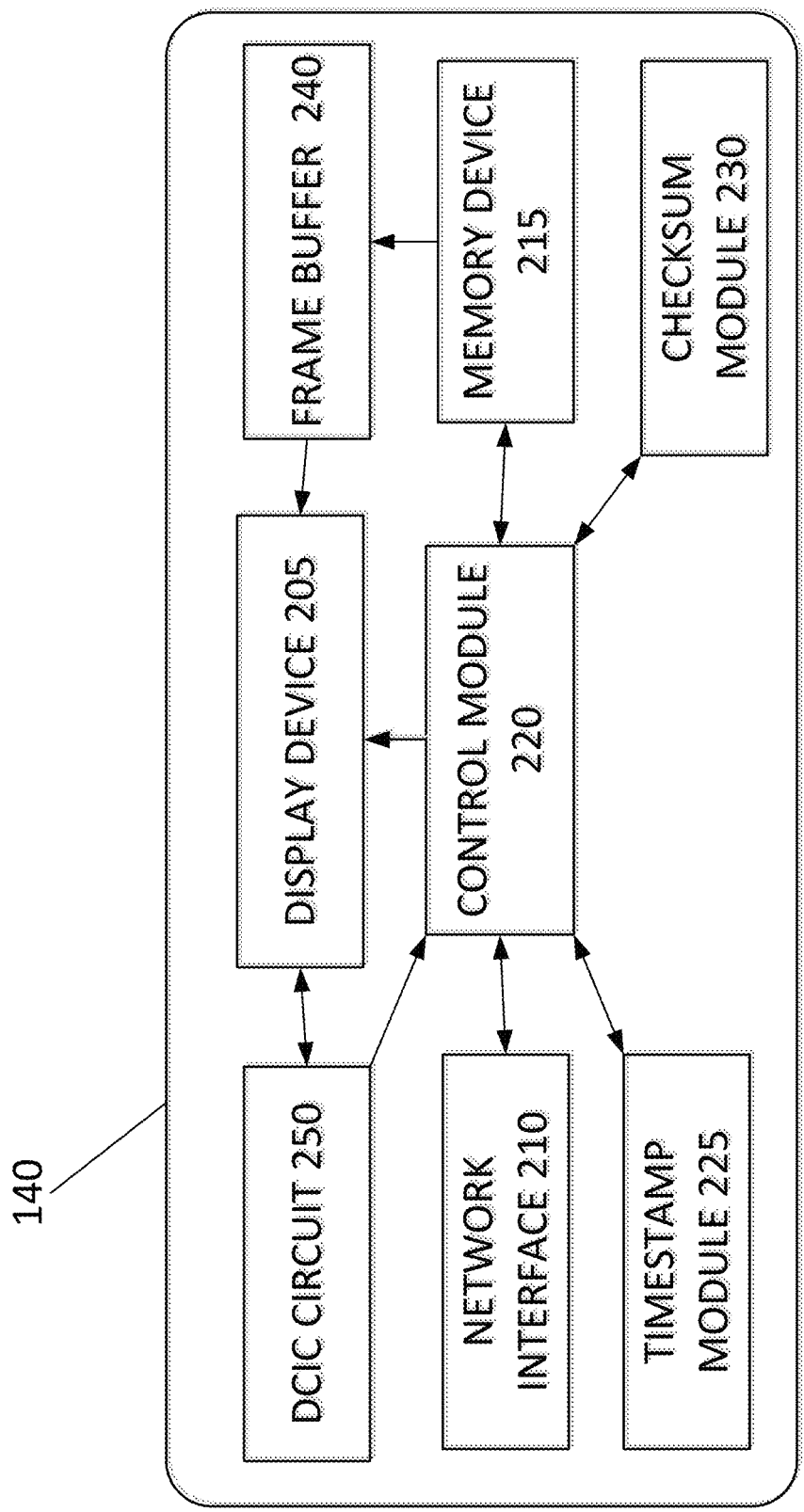
FIG. 2 depicts a thin-client display device, according to an embodiment.

Turning now to FIG. 2, FIG. 2 depicts one embodiment of thin-client display devices 140. Thin-client display devices 140 may include a display device 205, a network interface 210, member device 215, control module 220, timestamp module 225, checksum module 230, frame buffer 240, and DCIC circuit 250. In embodiments, the elements associated with thin-client display devices 140 may be physically located at the thin-client display devices 140. However, in other embodiments, certain elements associated with thin-client display devices 140 may be remotely provisioned via server 120. In implementations, system 100 may include a plurality of thin-client display devices 140, which are each configured to display content independently and asynchronously.

Display device 205 may be a monitor comprising a display, circuitry, casing, audio outputs, and a power supply. For example, display device may include LED displays, film transistor liquid crystal displays, organic light-emitting diode displays, etc. Display device 205 may be configured to present content, via series of frames, received by thin-client display device 160 to users. In embodiments, display device 205 may be associated with a display on a computer, television, tablet, telephone, gaming console, electronic signage device, etc. One skilled in the art may appreciate that display device 205 may be configured to present content to a plurality of different forms, including pictures, video, audio, etc.

Network interface 210 may be a communications device that allows thin-client display device 140 to communicate content and data over network 110. First network interface 210 may include one or more wireless transceivers for performing wireless communication and/or one or more communication ports for performing wired communication. In implementations, network interface 210 may be configured to communicate data over a plurality of different standards and/or protocols. In embodiments thin-client display device 140 may log onto network 110 upon being initialized, at a predetermined time during an operation cycle, or any other scheduled time. For example, at 8:00 AM on Monday through Fridays, the thin-client display device 140 may log onto network 110 to access content from content server 120. Responsive to being logged into network 110, network interface 210 may be configured to receive priority messages from third party content sources. The priority message may also include timing data, indicating how long the media associated with the priority message should be presented on the thin-client. In embodiments, network interface 210 may also be configured to download network credentials to log onto the network 110. The network credentials for may be stored locally within the memory device 215 or may be downloaded, updated, etc. via network 110. Network interface 210 may be configured to allow thin-client display device 140 to log onto network 110 responsive to downloading the network credentials for network 110. Responsive to logging into network 110, network interface 210 may be configured download content associated with local content sources to be presented on display device 205.

Memory device 215 may be a device that stores data or content generated or received by thin-client display device 140. Memory device 15 may include, but is not limited to a hard disc drive, an optical disc drive, and/or a flash memory drive. In embodiments, memory device 15 may be configured to store content or data received from content management server 120 and/or network 110. Memory device 215 may also be configured to store data, such as timestamps and checksums In embodiments, memory device 220 may be configured to transmit content received from control module 220 to a frame buffer 240. Memory device 215 may also be configured to store data, such as mappings, checksums, timestamps, etc. generated by thin-client display device 140.

Control module 220 may be a hardware processing device including memory, e.g., read only memory (ROM) and random access memory (RAM), storing processor-executable instructions and one or more processors that execute the processor-executable instructions. Control module 220 may execute an operating system of thin-client display device 140 or software associated with other elements of thin-client display device 140. For example, control module 220 may include a power control module configured to control the power settings of thin-client display device, admin control module configured to control security setting of thin-client display device 140 that may allow thin-client display device 140 to connect to a network 110, and a history module configured to store data associated with content presented on the display device 205.

Timestamp module 225 may be a hardware processing device configured to create a timestamp utilizing a sequence of characters or encoded information identifying when a certain event occurred. For example, timestamp module 225 may be configured to create a timestamp including a data and time of day. Timestamp module 225 may be configured to create a timestamp at set intervals, such as every second, minute, hour, etc. or responsive to a new frame being presented on display device 205. Responsive to timestamp module 225 creating a timestamp, timestamp module 225 may transmit data associated with the timestamp to control module 220.

Checksum module 230 may be configured to create a checksum associated with a frame of content presented on display device 205 or a frame of the content is stored within frame buffer 240, while the content is stored within frame buffer 240. The checksum may be a unique identifier that is associated with the content presented on display device 205 or content stored within frame buffer 240, wherein the checksum may be utilized to replicate the content displayed or to be displayed at a given point in time.

Frame buffer 240 may be a portion of RAM including a bitmap that is configured to present frames of media on display device 205 from memory device 215. In embodiments, frame buffer 240 may be positioned between control module 220 and display device 205 on a first circuit path. Data stored within frame buffer 240 may include color values for every pixel that may be displayed on display device 205 on a given frame. In other embodiments, the data stored within frame buffer 240 may be any implementation utilized to recreate a frame of the content. Utilizing the data within the frame buffer 240, checksum module 230 may be configured to determine a first checksum associated with each frame of the content to be presented on display device 205, while the content is stored within the frame buffer. Responsive to determining a first checksum for a frame of content to be displayed, timestamp module 225 may determine a corresponding first timestamp 225 associated with when the frame of content is to be displayed on display device 205 or when the first checksum is created. A first mapping of first checksums and corresponding first timestamps associated with data stored within frame buffer 240 may be stored within memory device 215.

DCIC circuit 250 may be a hardware processing device that is physically and electronically connected between a control module 220 and display device 205 in a second circuit path, wherein the second circuit path is an independent circuit path from the first circuit path. DCIC circuit 250 may be configured to determine data associated with a frame that is physically displayed on display device 205, while the frame is displayed. In embodiments, based on the data determined by DCIC circuit 250 when a frame is presented on display device 205, checksum module 230 may determine a second checksum associated with the frame that is physically presented on display device 205. Responsive to determining the second checksum for a frame of content actually displayed, timestamp module 225 may determine a corresponding second timestamp 225 associated with when the frame of content is actually displayed on display device 205. If the frame associated with the content is presented on the display device 205 directly after being loaded into the frame buffer 240, the first timestamp and the second timestamp should be identical or relatively close to each other (i.e. within 1-10 seconds). A second mapping of second checksums and corresponding second timestamps associated with content actually displayed on display device 205 may be stored within memory device 215. In embodiments, an identical frame may have a matching first checksum and second checksum due to the data being used to create the checksums being identical.

However, if frame buffer 240 is overridden before the content is presented on the display device 205, the second checksum associated with the frame may never be created. Thus, there may not be a mapping of matching first and second checksums.

Additionally, if display device 205 is turned off before the frame is presented on display device, then the second checksum may never be created with the corresponding second timestamp because the frame may never be presented on display device. If the display device 205 is later turned on, and the corresponding frame is presented on display device 205, the corresponding first checksum and second checksum may match, but the corresponding first checksum and second checksum may differ.

To this end, embodiments create an auditing process that is employed at the hardware level that detects and determines when frames are physically presented on display devices, and not at the software level that is currently implemented.

Figure 3:
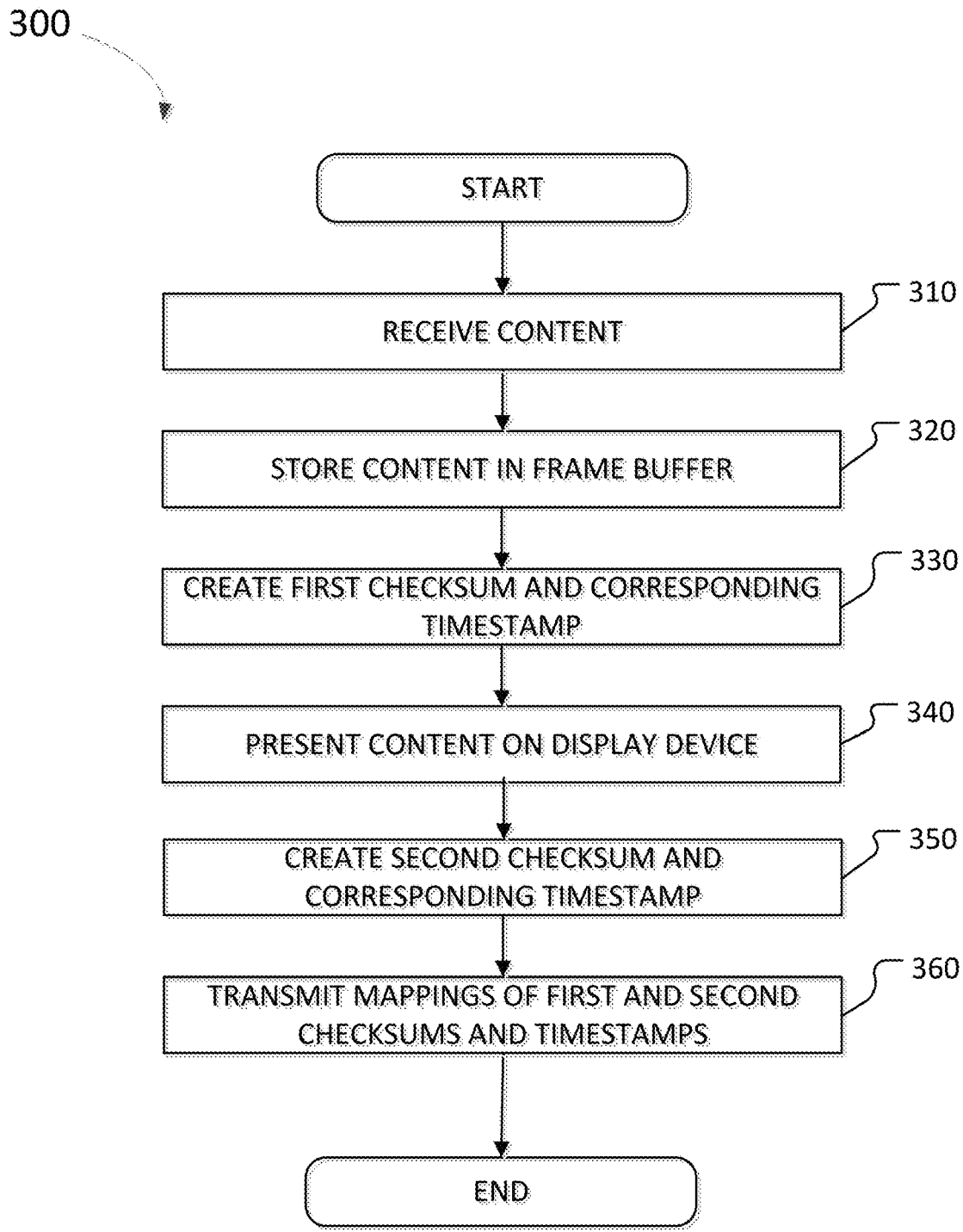
FIG. 3 depicts a method for a hardware verified feedback loop for content presented on a display device, according to an embodiment.

FIG. 3 illustrates a method 300 for a hardware verified feedback loop for content presented on a display device. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a solid-state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At operation 310, content may be received by a thin-client display device.

At operation 320, the received content may be stored within a frame buffer. Specifically, frames associated with the content may be individually indexed and stored within the frame buffer in a chronological order.

At operation 330, responsive to storing the content within the frame buffer, a first checksum associated with a frame of data to be presented on the display device may be created by a checksum module. Responsive to determining a first checksum for a frame of content to be displayed, a timestamp module may determine a corresponding first timestamp associated with when the frame of content is to be displayed on the display device. The first checksum and corresponding first timestamp may be mapped and stored within a memory device.

At operation 340, the content may be presented on the display device.

At operation 350, responsive to presenting a frame of the content on the display device, a DCIC circuit may determine data associated with the frame of the presented content. Based on the data associated with the frame, the checksum module may determine a second checksum based on the frame actually being presented on the display device. Responsive to determining a second checksum for a frame of content actually displayed on the display device, a timestamp module may determine a corresponding second timestamp associated with when the frame of content displayed on the display device. The second checksum and corresponding timestamp may be mapped, and stored within a memory device.

At operation 360, the mappings associated with the first and second checksums and first and second timestamps may be transmitted to a content server. The mappings may be utilized to determine if and when content received by the display device was actually displayed on the display device. Thus, a hardware level verified feedback loop may be created content presented on the display device.

Figure 4:
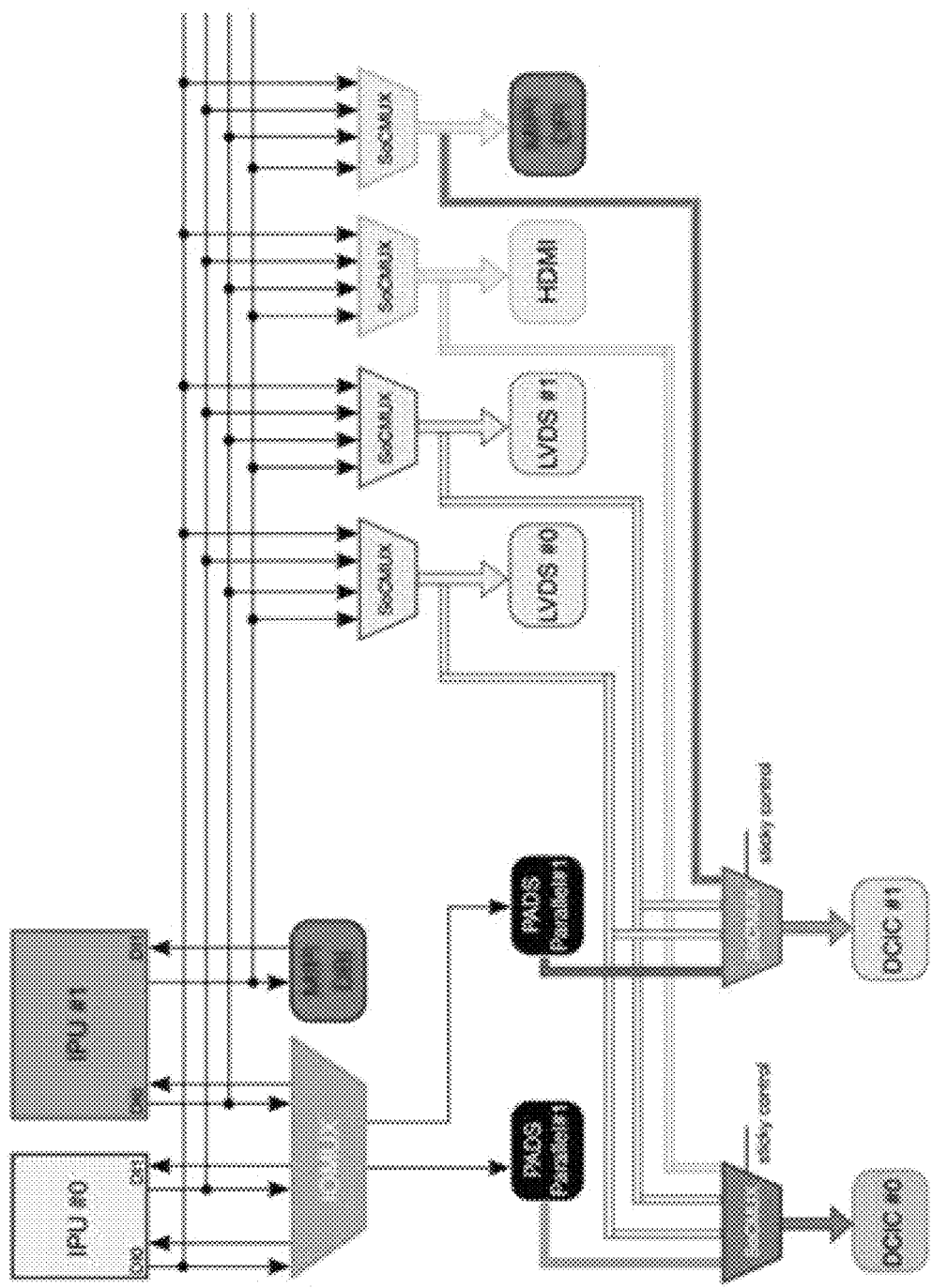
FIG. 4 depicts a DCIC circuit, according to an embodiment.

FIG. 4 depicts one embodiment of a DCIC circuit 250.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to scale.

Embodiments in accordance with the present invention may be embodied as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable content may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present invention may be written in any combination of one or more programming languages.

The flowcharts and block diagrams in the flow diagrams illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowcharts and/or block diagrams.

What is claimed is:

1. A hardware system configured to verify content has been presented, the system comprising:
    a memory device configured to store the content, the content including a first frame;
    a frame buffer to temporarily store the content including the first frame;
    a display device located at a thin-client device configured to display the first frame;
    a checksum hardware device configured to determine a first checksum and a first timestamp for the first frame when the first frame is stored within the frame buffer, and to determine at the thin-client device a second checksum and a second timestamp for the first frame when the first frame is physically displayed on the display device located at the thin-client device, wherein the first timestamp is associated with a first date and time when the first frame is stored within the frame buffer and the second timestamp is associated with a second date and time when the first frame is physically displayed on the display device, wherein the second checksum is determined based on data associated with the first frame being physically displayed on the display device, and the second checksum is determined simultaneously when the first frame is physically displayed on the display, wherein when the display device is turned off before the first frame is displayed on the display device then the second checksum will not be created.

2. The system of claim 1, wherein the first checksum and the second checksum match when the first frame is presented on the display device.

3. The system of claim 2, wherein the first timestamp and the second timestamp correspond with each other when the first frame is presented on the display device.

4. The system of claim 1, wherein the checksum hardware device is a hardware device that is physically located at the display device.

5. The system of claim 1, wherein the checksum hardware device is physically located between a microprocessor and the display device.

6. The system of claim 5, wherein the microprocessor is configured to transmit the content to the frame buffer.

7. The system of claim 1, wherein the display device is associated with a thin-client device.

8. The system of claim 1, wherein the first checksum and the second checksum are utilized to recreate the first frame.

9. The system of claim 1, wherein when the frame buffer is overridden while the first frame is stored within the frame buffer, the second checksum will not be created.

10. The system of claim 1, wherein the content includes a plurality of frames, and the checksum hardware device is configured to determine first checksums and first timestamps for each of the plurality of frames loaded into the frame buffer, and the checksum hardware device is configured to determine second checksums and second timestamps for each of the plurality of framed presented on the display device.

11. A method to verify content has been presented, the method comprising:
    storing the content on a memory device, the content including a first frame;
    temporarily storing the content including the first frame in a frame buffer;
    creating a first checksum and a first timestamp for the first frame when the first frame is stored within the frame buffer, the first timestamp being associated with a first date and time when the first frame is stored within the frame buffer;
    display the first frame on a display device at a thin-client device;
    creating a second checksum and a second timestamp for the first frame when the first frame is physically displayed on the display device, the second timestamp being associated with a second date and time when the first frame is physically displayed on the display device, wherein the second checksum is determined based on data associated with the first frame being physically displayed on the display device, and the second checksum is determined simultaneously when the first frame is physically displayed on the display, wherein when the display device is turned off before the first frame is displayed on the display device then the second checksum will not be created.

12. The method of claim 11, further comprising:
    matching the first checksum and the second checksum match when the first frame is presented on the display device.

13. The method of claim 12, wherein the first timestamp and the second timestamp correspond with each other when the first frame is presented on the display device.

14. The method of claim 11, wherein the first checksum and the second checksum are created by a hardware device that is physically located at the display device.

15. The method of claim 14, wherein the hardware device configured to create the first checksum and the second checksum is physically located between a microprocessor and the display device.

16. The method of claim 15, further comprising:
transmitting, via the microprocessor, the content to the frame buffer.

17. The method of claim 11, wherein the display device is associated with a thin-client device.

18. The method of claim 11, wherein the first checksum and the second checksum are utilized to recreate the first frame.

19. The method of claim 11, further comprising:
overriding the frame buffer, wherein when the frame buffer is overridden while the first frame is stored within the frame buffer, the second checksum will not be created.

20. The method of claim 11, wherein the content includes a plurality of frames, and the checksum hardware device is configured to determine first checksums and first timestamps for each of the plurality of frames loaded into the frame buffer, and the checksum hardware device is configured to determine second checksums and second timestamps for each of the plurality of framed presented on the display device.

* * * * *